(12) United States Patent
Fujita et al.

(10) Patent No.: US 7,156,457 B2
(45) Date of Patent: Jan. 2, 2007

(54) SEAT STRUCTURE

(75) Inventors: Etsunori Fujita, Hiroshima (JP); Naoki Ochiai, Hiroshima (JP); Makoto Tarusawa, Hiroshima (JP); Eiji Sugimoto, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 261 days.

(21) Appl. No.: 10/689,292

(22) Filed: Oct. 20, 2003

(65) Prior Publication Data

US 2004/0178667 A1  Sep. 16, 2004

(30) Foreign Application Priority Data

Oct. 28, 2002 (JP) .............................. 2002-312466

(51) Int. Cl.
*B60N 2/427* (2006.01)
(52) U.S. Cl. .............................. 297/216.1; 297/284.11; 297/452.56
(58) Field of Classification Search ............. 297/216.1, 297/284.11, 284.2, 452.56
See application file for complete search history.

(56) References Cited

U.S. PATENT DOCUMENTS

| | | | | |
|---|---|---|---|---|
| 1,649,013 A | * | 11/1927 | Bell | 297/299 |
| 2,633,184 A | * | 3/1953 | Karg | 5/247 |
| 3,273,877 A | * | 9/1966 | Geller et al. | 267/89 |
| 3,387,884 A | * | 6/1968 | Mutz, Jr. | 297/302.4 |
| 5,439,271 A | * | 8/1995 | Ryan | 297/452.56 |
| 6,050,635 A | * | 4/2000 | Pajon et al. | 297/216.1 |
| 6,604,792 B1 | * | 8/2003 | Picard | 297/452.56 |
| 6,854,805 B1 | * | 2/2005 | Fujita et al. | 297/452.56 |

* cited by examiner

*Primary Examiner*—Peter R. Brown
(74) *Attorney, Agent, or Firm*—Wolf Block Schorr & Solis-Cohen LLP

(57) ABSTRACT

Seat structure designed to reduce weight and improve various functions such as impact absorbency, vibration absorbency. A torsion bar arranged along a width direction, and an arm connected to the torsion bar and enforced in a direction of falling backwards in a normal state are provided in the rear of a seat cushion, and a cushioning member is arranged between a supporting frame supported by the arm and a front frame provided at the front of the seat cushion, whose front edge is vertically movable rotationally. When working a pedal or standing up, since the front edge of the front frame is forced to move in a downward direction by a leg portion, a haunch supporting portion of the cushioning member is relatively lifted upward, so that support force to lift up the haunches works.

9 Claims, 7 Drawing Sheets

F I G. 1
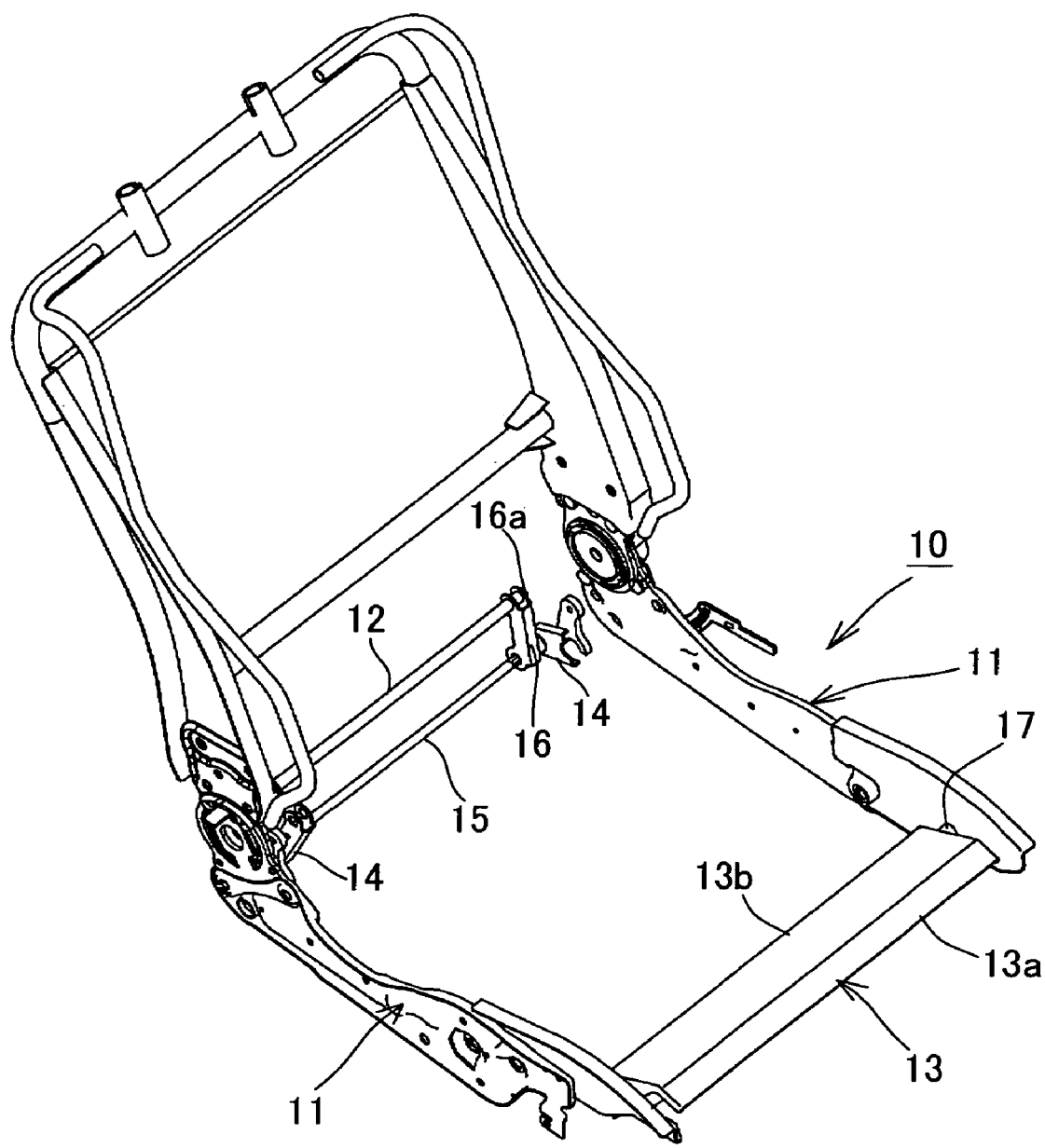

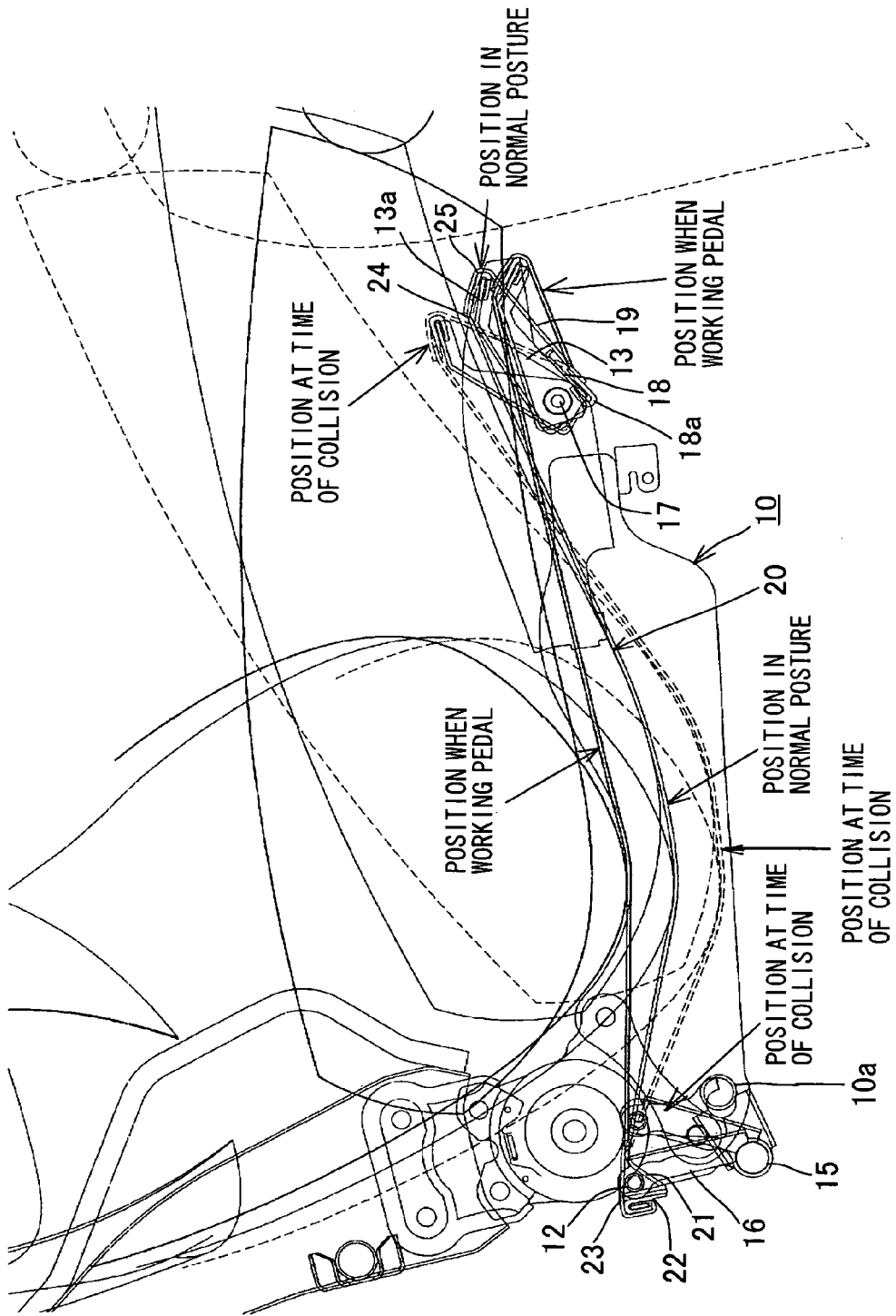

F I G. 5A
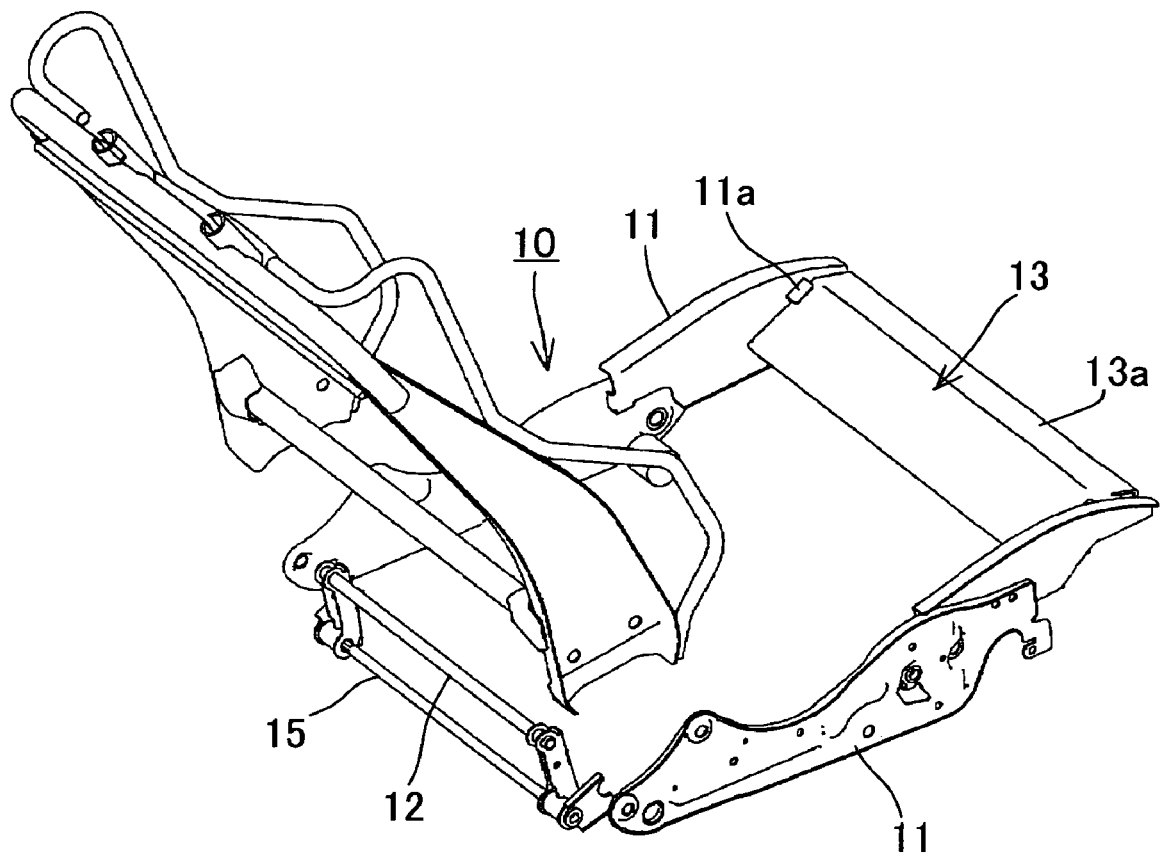
F I G. 5B
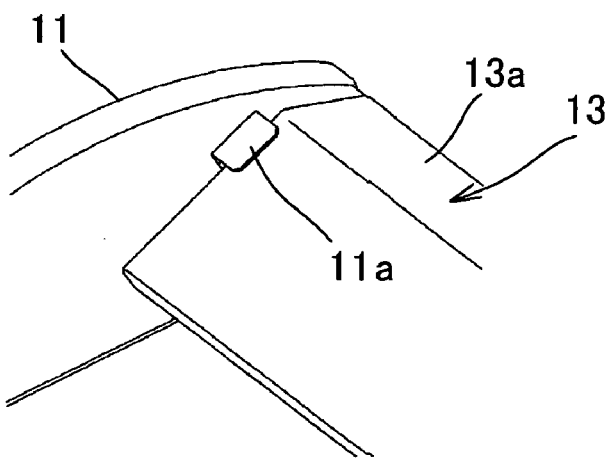

SEAT STRUCTURE

FIELD OF INVENTION

The present invention relates to a seat structure, to be more in detail, relates to a seat structure suitable for a seat for transportation machines such as an aircraft, a train, a ship, a forklift, an automobile, and the like, or for various chairs or wheel chairs used inside or outside of a residence.

BACKGROUND OF THE INVENTION

For a seat used for an aircraft, a train, a ship, an automobile, and the like, improvement of various functions such as physique difference absorbency, posture difference absorbency, body movability, and so on are always required in addition to improvement of basic functions such as impact absorbency, vibration absorbency, and so on, in order to supplement these functions and obtain better riding comfort. Further, in recent years, in order to reduce weight of transportation machines such as the automobile from a viewpoint of environmental measures by improving fuel economy, a reduction in weight of the seat used for these transportation machines is desired in addition to the improvement of the various functions described above, and technology to use a thinner and lighter cushioning member or the like is proposed.

For example, from the above viewpoint, the present applicant has proposed a seat structure with sufficient characteristics (a spring characteristic or a damping characteristic) as a cushioning member although light weighted by using a three-dimensional net member (a solid knitted fabric) having a thickness of about several millimeters to several tens or millimeters strained to frames as a tension structure.

However, in order to exhibit sufficiently the characteristics required for the seat or the like of the automobile using such a solid knitted fabric, the various functions such as the vibration absorbency, the physique difference absorbency, and the like are required to serve effectively by disposing a flat-type supporting member composed of a two-dimensional net member or the solid knitted fabric, or a flat-type elastic member called Plumaflex(™) or the like under the solid knitted fabric, and by supporting it with plural metal springs (coil springs) to supplement a feel of a spring and to support a load dispersedly. However, when the plural coil springs are arranged, the solid knitted fabric itself being thin, a seated person may often feel hitting of the coil springs to the solid knitted fabric as a feeling of something foreign. Accordingly, an increase of the number of solid knitted fabric layers or a disposition of another cushioning member such as a urethane member between the solid knitted fabric and the coil springs has been put into practice conventionally as an alleviation measure of the feeling of something foreign. Therefore, if the number of the arranged coil springs that cause the feeling of something foreign can be reduced, or if the coil springs can be arranged to somewhere not likely to be felt as a something foreign, a further reduction in weight can be expected by reducing the number of the solid knitted fabric layers, disappearing of necessity to intercalate another cushioning member such as the urethane member, or the like.

When the urethane member that has been generally used as a cushioning member is used, a thickness of urethane member is usually ensured to be 30 mm or more in order not to make the seated person feel something foreign for items different in stiffness such as a wire, a frame, or the like. However, when a urethane member that is made thinner in thickness and lighter in weight is used, there arises a similar disadvantage as the case of the solid knitted fabric. When another cushioning member such as, for example, a two-dimensional net member (a flat-type spring member) containing elastic yarn is used, there also arises a similar disadvantage as the above-mentioned case of the solid knitted fabric since the thickness of the member is thin. When the plural two-dimensional net members (flat-type spring members), solid knitted fabrics, or urethane members are used in combination in arbitrary number, a thinner and a lighter cushioning structure can be attained by reducing the number of the arranged coil springs or changing a place of arrangement.

Furthermore, as for the impact absorbency required for the seat for the transportation machines such as the automobile or the like, a reduction of a rebound or the like of a human body from the seat at the time of collision is particularly required. As a measure for this requirement, such a structure that a collision load received in a longitudinal direction is converted to a rotational moment of inertia force around the tuber of ischium and that a seating angle is so changed that depression of the haunches becomes large is desired.

On the other hand, a standard posture of a person being seated on a chair is a state that the haunches of the person are positioned in the rear of a seat cushion of the chair, and that the waist portion of the person abuts on a seat back of the chair. However, there is a report about a way of being seated called a sacrum posture that the haunches move toward front so that the sacrum portion touches the seat cushion (*Bulletin of Japanese Society for the Science of Design*, Vol. 48, No. 1 2001, pp. 49 to 56, "Suspension Optimum Characteristic of a Wheel Chair for a Handicapped Person Taking Difference in Physique into Consideration") as a seating posture of the person, especially when an elderly person or a child having small physique is seated, or when the person is seated for a long time. The same thing can be said of the seat for the transportation machines such as the automobile or the like, a chair for office work or for a theater as well as a wheel chair, and such a development of a seat structure as absorbing a difference in physique and a difference in posture without damaging so much of the impact absorbency or the vibration absorbency and as attaining a comfortable sitting comfort is desired even if the person is seated in such a sacrum posture.

Meanwhile, such a structure that the person can easily stand up when he/she stands up from a seating posture is also desired for any of the seat for the aforementioned transportation machines such as the automobile or the like, or for various chairs or wheel chairs used inside or outside of a residence. Furthermore, a small pressure on a femoral region when working a pedal is also desired for a driver's seat of the automobile.

OBJECTS AND SUMMARY OF THE INVENTION

The present invention has been made in view of the above situations and an object of the present invention is to provide a seat structure which enables not only to realize further reduction in weight than conventional ones and to improve respective functions such as impact absorbency, vibration absorbency, posture difference absorbency, physique difference absorbency, and body movability but also to improve easiness of a movement of standing up, and to reduce pressure on a femoral region when working a pedal.

In order to achieve the above object and others, the present inventors thought that, by taking a structure which can easily change a shape of a cushioning member, a position for supporting haunches, or the like to be suitable in shape or position for impact absorption or the movement of standing up at the time of an impact or the time of standing up, in addition to use of a torsion bar disposing at a place where a seated person is not likely to feel something foreign in place of a coil spring conventionally disposed in the vicinity of the body, the aforementioned various characteristics can be improved in addition to weight reduction; therefore, the present inventors have completed the present invention.

That is, one embodiment of the present invention provides a seat structure, comprising:

an arm arranged in the rear of a seat cushion and enforced in a direction of falling backwards with a torsion bar in a normal state;

a supporting frame supported by the arm and arranged along a width direction in the rear of the seat cushion;

a front frame arranged in the front of the seat cushion, having a predetermined width in a longitudinal direction of the seat cushion, and its front edge being movably supported in a vertical direction;

a cushioning member spread over between the supporting frame and the front frame, and strained by an elastic force of the torsion bar; and a standard position setting member for setting an upward moving position of the front edge of the front frame when a person is seated on the cushioning member in a standard posture, wherein the front edge of the front frame is moved more in an upward direction than a standard position when a load for depressing any portion of the cushioning member is applied compared with the time of being seated on the cushioning member in the standard posture, and a haunch supporting portion of the cushioning member is lifted upward by forcing the front edge of the front frame more in a downward direction than the standard position.

Another embodiment of the present invention provides a seat structure wherein the front frame is made of a plate-shaped member having a predetermined width in the longitudinal direction of the seat cushion, and its rear edge is supported pivotably between side frames of the seat cushion.

In another embodiment of the present invention, the standard position setting member is an elastic member for enforcing the front edge of the front frame in the downward direction, and has the elastic force for balancing the front edge of the front frame in the standard position against tension of the cushioning member generated at the time of being seated in the standard posture.

It still another embodiment of the present invention, the elastic member comprises a flat-type spring member strained between the front edge of the front frame and a fixed frame arranged below the front frame.

The standard position setting member may be an abutting piece for abutting on an upper surface of the front frame at the time of being seated in the standard posture and for setting the front edge of the front frame at the standard position, being protruded inside from at least one of the side frames.

The cushioning member may comprise a flat-type spring member, a three-dimensional net member, and a urethane member or a combination of two kinds or more of these members.

Another cushioning member may be arranged above the cushioning member. This additional cushioning member may be spread over together with the cushioning member between the supporting frame and the front frame, and is strained by the elastic force of the torsion bar. This additional cushioning member may comprise a flat-type spring member, a three-dimensional net member, and a urethane member or a combination of two or more of these members.

BRIEF DESCRIPTION OF THE DRAWINGS

A more complete appreciation of the present invention and many of the attendant advantages thereof will be readily understood by reference to the following detailed description when taken in conjunction with the accompanying drawings, in which:

FIG. 1 is a schematic perspective view showing a frame structure of a seat structure relating to an embodiment of the present invention;

FIG. 3 is a view for explaining an operation of the seat structure relating to the aforementioned embodiment;

FIG. 4A is a view showing a state when a person is being seated in a standard posture, FIG. 4B is a view showing a state when the person is being seated in a sacrum posture, and FIG. 4C is a view showing a state when the person is standing up;

FIG. 5A and FIG. 5B are schematic perspective views showing a frame structure of a seat structure relating to another embodiment of the present invention;

DETAILED DESCRIPTION OF THE PREFERRED EMBODIMENT

Figure 2:
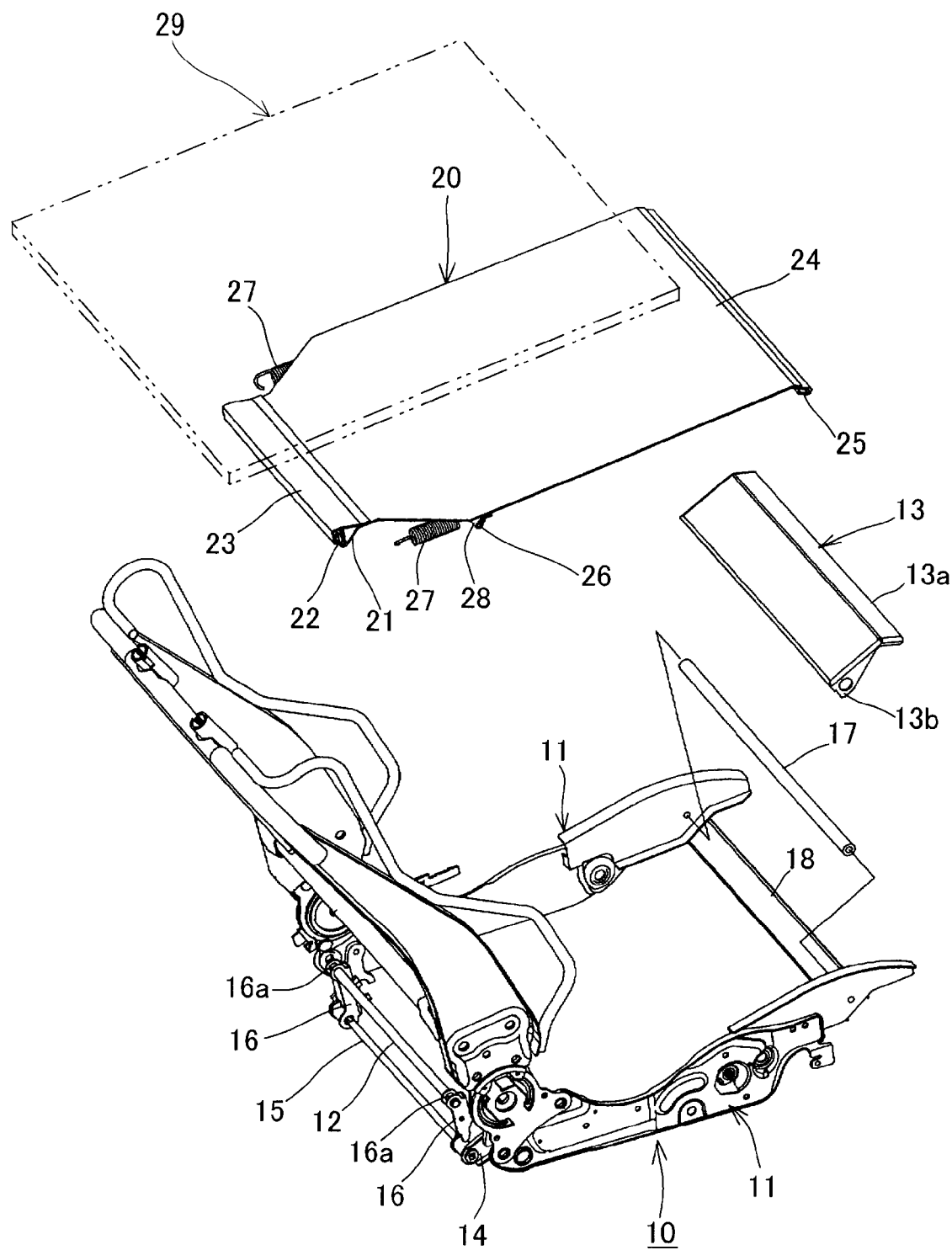
FIG. 2 is an exploded perspective view showing the seat structure relating to the aforementioned embodiment.

Hereinafter, the present invention will be explained further in detail based on embodiments shown in the drawings. FIGS. 1–3 are views showing a principal portion of a seat structure relating to an embodiment of the present invention. As shown in these drawings, a seat cushion 10 constituting the seat structure of this embodiment is structured by including a pair of side frames 11, 11 arranged at a predetermined spaced interval in a width direction, a supporting frame 12 disposed in the rear of the seat cushion 10, a front frame 13 disposed in front of the seat cushion 10, and a cushioning member 20.

Brackets 14 are connected to respective rear end portions of the pair of side frames 11, and a torsion bar 15 is arranged between a pair of brackets 14. One end portion of the torsion bar 15 is formed as, for example, a square shape in a cross section, and is a fixed end by fitting to, for example, a square fitting hole formed on one bracket 14 while the other end portion thereof is a free end rotatably supported with the other bracket 14. As a result, the torsion bar 15 exhibits a predetermined spring characteristic by being twisted on the free end side.

Arms 16 are provided in the vicinity of the respective end portions of the torsion bar 15. In one of the arms 16 disposed on the fixed end side of the torsion bar 15, its base end portion is pivotably arranged to the torsion bar 15, and in the other arm 16 disposed at the free end side of the torsion bar 15, its base end portion is connected directly to the torsion bar 15 to be enforced in a direction of falling backwards by its torsion torque. Besides, the supporting frame 12 is arranged along the width direction of the seat cushion 10 between upper end portions 16a of thus provided respective arms 16. Accordingly, the supporting frame 12 is provided, being enforced in a direction of falling backwards in a normal state by the torsion bar 15 via the respective arms 16.

A supporting shaft 17 is spread over in the vicinity of respective front end portions of the pair of side frames 11, and a rear edge 13b of the front frame 13 made of a plate-shaped member having a predetermined width in a longitudinal direction of the seat cushion is supported pivotably by the supporting shaft 17. Accordingly, the front frame 13 is so structured that its front edge 13a side is vertically movable around the supporting shaft 17.

The cushioning member 20 is arranged by spreading over between the supporting frame 12 and the front frame 13 provided as above. Specifically, as shown in FIG. 3, a setting plate 22 made of synthetic resin having a substantially U-shaped cross section is mounted on a rear end portion 21 of the cushioning member 20, and the setting plate 22 is pulled out to the back of the supporting frame 12 by passing the rear end portion 21 below the supporting frame 12; simultaneously, an auxiliary cloth member 23 is connected in the vicinity of the rear end portion 21 of the cushioning member 20, and its end portion is inserted in a groove of the setting plate 22 formed as a substantially U-shaped cross section by positioning the auxiliary cloth member 23 above the supporting frame 12, thereby being supported by the supporting frame 12. A front end portion 24 of the cushioning member 20 is so structured that a setting plate 25 made of synthetic resin similarly having a substantially U-shaped cross section is mounted, and its groove is supported by engaging with the front edge 13a of the front frame 13. Accordingly, the cushioning member 20 is strained between the supporting frame 12 and the front frame 13 via the supporting frame 12 and the arms 16 by an elastic force of the torsion bar 15.

As described above, the supporting frame 12 and the front frame 13 are not fixed at a predetermined position. Accordingly, when a person is seated on the cushioning member 20 strained between the supporting frame 12 and the front frame 13, the cushioning member 20 is depressed with no limit in a range that the front edge 13a of the front frame 13 is movable rotationally in an upward direction if there is no restriction. Therefore, a standard position setting member for restricting a pivoting range of the front frame 13 is required in order to stabilize an amount of the depression of the cushioning member 20 when he/she is seated in a standard posture.

A structure of the standard position setting member is not limited as long as it is a member for performing the above-mentioned functions. In this embodiment, as shown in FIG. 3, a flat-type spring member 19 whose one end is fixed to the front edge 13a of the front frame 13 and whose other end is engaged with an auxiliary frame 18 arranged between the side frames 11, below the front frame 13 via a setting plate 18a is used. In other words, by a restoring force of the flat-type spring member 19, the front edge 13a of the front frame 13 is enforced to be movable rotationally in a downward direction so that a moving position in an upward direction of the front frame 13 when a load is applied to the cushioning member 20 is controlled. The restoring force of the flat-type spring member 19 is so adjusted that a pivoting angle around the supporting shaft 17 is a desired angle when the person is seated in a standard posture.

It should be noted that another elastic member in place of the flat-type spring member 19, for example, a coil spring (not shown) as a metal spring can be spread over between the front edge 13a of the front frame 13 and the auxiliary frame 18. However, in this case, in order to reduce a feeling of the coil spring as something foreign, such a measure that a thickness in the vicinity of the front end portion of the cushioning member 20 is made thicker is necessary. Furthermore, in place of the flat-type spring member 19, the front frame 13 can be supported using a torsion bar (not shown). However, at any events, the flat-type spring member 19 is preferable because it can be easily and affordably provided as the standard position setting member. Incidentally, the flat-type spring member 19 is a two-dimensional net member (a cloth member) formed containing elastic yarn.

Here, as shown in FIG. 2, a bag-shaped member 28 is mounted on a back face of the cushioning member 20 more slightly in a direction of a rear end portion than a substantially central portion in a longitudinal direction of the seat cushion, and a wire member 26 made of spring steel to prevent a feeling of stagger when inertia force is affected at the time of being seated is loosely inserted in the bag-shaped member 28. One ends of coil springs 27 as an auxiliary spring means are engaged in the vicinity of respective end portions of the wire member 26. The other ends of the coil springs 27 are supported by engaging with any frames arranged in the rear of the seating portion 10. Since a seated person is likely to feel the coil springs 27 as something foreign when they are arranged in the vicinity of a body side of the seated person, it is preferable to provide them at a position where the seated person is not likely to feel them as something foreign, and for instance, as in this embodiment, it is preferable to arrange them from a middle position in the longitudinal direction of the seat cushion 10 to the rear end of the seat cushion. In addition, it is preferable to provide one ends of the coil springs 27 positioned at the middle in the longitudinal direction of the seat cushion 10 in the vicinity of the tuber of ischium or in the vicinity of a trunk axis which corresponds to the center of gravity of a human body at the time of being seated, so that the coil spring 27 can be worked effectively for a vibration input. Therefore, it is recommendable to set the wire member 26 made of spring steel to be engaged with one ends of the coil springs 27 within a range of 150 mm in the longitudinal direction of the seat cushion, preferably 100 mm, more preferably 50 mm when taking the center of gravity of the seated person at the time of being seated as a criterion.

The cushioning member 20 is formed from one kind selected from a flat-type spring member, a three-dimensional net member (a solid knitted fabric), and a urethane member or an appropriate combination of two kinds or more of these members. The cushioning member 20 can be used as a cushioning layer of a surface layer where a person is directly seated thereon; or another cushioning member 29 can be used as a surface layer and the cushioning member 20 of this embodiment can be used as a cushioning layer of a base layer by disposing another cushioning member 29 described above as shown in FIG. 2 on the cushioning member 20. Incidentally, another cushioning member 29 can be formed from one kind selected from the flat-type spring member, the solid knitted fabric, and the urethane member or an appropriate combination of two kinds or more of these members. In addition, when another cushioning member 29 is arranged, it is preferable that another cushioning member is also strained between the supporting frame 12 supported by torsion bar 15 and front frame 13 pivotably provided.

The flat-type spring member constituting the aforementioned cushioning member is formed from a two-dimensional net member (a cloth member) containing elastic yarn, for example, such a cloth member that either one of the warp or the weft is composed of elastic yarn such as a polyester elastomer fiber, a polyurethane fiber and the like, and that another is composed of yarn which has smaller elasticity than the elastic yarn such as a nylon fiber, a polyester fiber, and the like can be used. Incidentally, the same type of the cloth member can be used for the flat-type spring member 19 used for the aforementioned standard position setting member. Besides, the solid knitted fabric is prepared by connecting front and back layers of a ground knitted fabric with connecting yarn made of monofilament and the like in a cross or in a truss.

Next, a function of the seat structure in this embodiment will be explained. First, a position of the cushioning member 20 when a person is seated in a standard posture is a position shown with a thin solid line in FIG. 3. In this case, the arm 16 is pivoted in a direction of falling forwards against the elastic force of the torsion bar 15 by a load on the cushioning member 20 from a substantially vertical state at the time of no load. Meanwhile, the front frame 13 is so structured that its front edge 13a is moved rotationally upwards by depression of the cushioning member 20; however, an amount of moving is controlled at a standard position by the restoring force of the flat-type spring member 19 as the standard position setting member.

In this case, a pivoting angle of the supporting frame 12 (the arm 16) supported by the torsion bar 15 differs depending on a weight of a seated person. Therefore, vibration absorbency by a spring characteristic of the torsion bar 15 does not differ largely by a difference in weight (a difference in physique) and is exhibited nearly stably. An initial tension of the torsion bar 15 is so adjusted that the arm 16 is located at an unstable balanced position in an equilibrium state at the time of being seated. As a result, the restoring force of the torsion bar 15, as a first function of the seat structure of this embodiment, creates mainly a feeling of stroke and a balanced state effectively against a displacement from no load state to the equilibrium state, and carries a vibration absorbency function and an impact force absorbency function. Furthermore, as a second function of the seat structure of this embodiment, the coil spring 27 varies in a disposition angle between the no load state and the equilibrium state, so that the coil spring 27 works effectively in the equilibrium state mainly, absorbs a vibration effectively in a high-frequency band, and works more effectively to the minute vibration. Though the minute vibration can be treated with the torsion bar 15 also, a function to the minute vibration can be further improved by disposing the coil spring 27 at a region where the seated person does not feel something foreign as described above. Incidentally, the coil spring 27 also has a function for stably supporting the seated person against swaying from side to side.

In other words, in this embodiment, by utilizing the restoring force of the torsion bar 15, mainly the feeling of stroke and an unstable balanced state are created as described above. However, since the restoring force works sensitively to the minute vibration as described above, various characteristics such as the vibration absorbency and the like required for a seat can be given sufficiently with only the torsion bar 15. Therefore, a design of a spring structure in a seat is more freely, resulting in a reduction of the number of coil springs to be used and a reduction in weight and cost.

As a result, coil springs in the vicinity of the body side which make the seated person feel something foreign do not need to be disposed; therefore, thicknesses of a solid knitted fabric, a urethane member and the like to be a cushioning layer composing a surface layer can be made thinner than the conventional manner, and the number of stacked layers can be reduced, and a distance between frames on a body side portion, namely, a frame pitch can be made smaller, which contributes to design a total seat structure small in size and light in weight.

In this state, when an impact load or a vibration larger than predetermined magnitude is inputted by collision and the like, an amount of depression of the cushioning member 20 positioned correspondingly to the vicinity of the tuber of ischium which is the center of gravity in a standard posture becomes large. Accordingly, the arm 16 and the supporting frame 12 are further pivoted in a direction of falling forwards against the elastic force of the torsion bar 15. When the arm 16 is pivoted at a predetermined amount, it abuts on a rear end frame 10a arranged in the vicinity of the rear end of the side frames 11, which controls unnecessary depression of the seated person. When pivoting of the arm 16 and the supporting frame 12 is controlled, subsequently the vicinity of the tuber of ischium is further depressed by elongation of the cushioning member 20, and a leg portion is lifted upward, which results in a generation of a rotational moment around the vicinity of the tuber of ischium. In this event, the front frame 13 is so structured that its front edge 13a is pivoted more upward than a position controlled by the flat-type spring member 19 as the standard position setting member according to the depression of the cushioning member 20. Accordingly, a force to alienate the human body from a seat surface is suppressed, and the back of the human body is pressed against the seat back of the seat, so that impact applied on the human body is effectively reduced.

Meanwhile, for example, in the case of using the above-mentioned seat as a driver's seat of an automobile, the front frame 13 is pressed so that its front edge 13a is moved rotationally in a downward direction by a leg portion (a femoral region) when working a pedal in the aforementioned standard posture. As a result, a degree of tension of the cushioning member 20 is so strong that its haunch supporting portion is lifted more upward than the standard position, resulting in lifting haunches upward. This reduces pressure on the leg portion by the front frame 13 and improves operationality of the pedal.

Figure 4A:
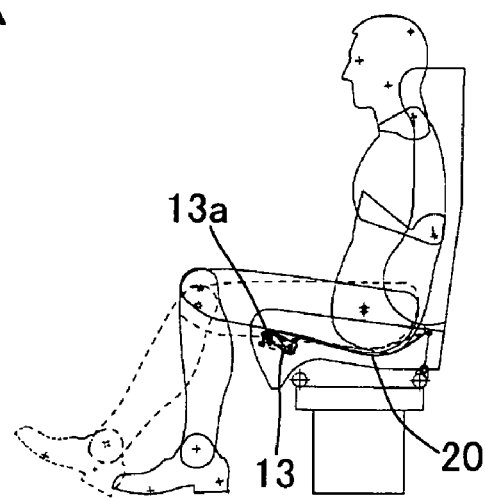
FIG. 4A, FIG. 4B and FIG. 4C are views for explaining the operation of the seat structure relating to the aforementioned embodiment.
Figure 4B:
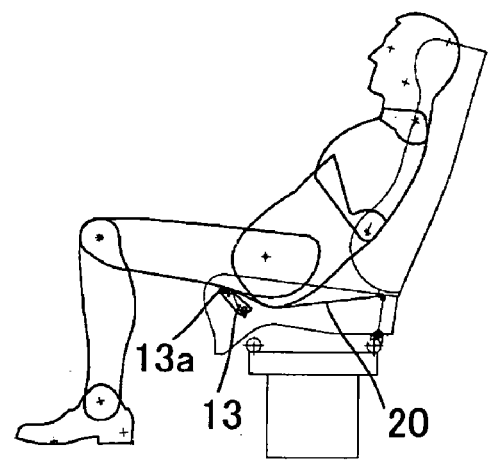
Figure 4C:
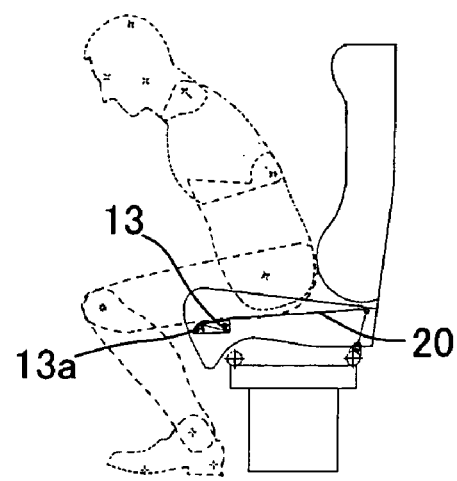

Meanwhile, as shown in FIG. 4A, FIG. 4B and FIG. 4C, when the seated person changes a posture from the standard posture in FIG. 4A to a relaxed posture (a sacrum posture) shown in FIG. 4B, a position of the haunches or the tuber of ischium is moved toward front of the cushioning member 20. Accordingly, in the cushioning member 20, the amount of depression of a portion more slightly toward a rear portion than the front frame 13 is larger than that of the case in the standard posture. This pivots the front edge 13a of the front frame 13 slightly more in the upward direction than the case of the standard posture. Since the position of the haunches is shifted toward the front frame when the sacrum posture is made, a feeling of holding or a feeling of support of the haunches by the cushioning member is usually reduced. However, according to this embodiment, since the front edge 13a of the front frame 13 is thus moved upward, the haunches are surely supported by the cushioning member 20 even if the sacrum posture is made, and as a result, the feeling of holding or the feeling of support of the haunches by the cushioning member 20 is not reduced.

Furthermore, as shown in FIG. 4C, at the time of standing up, the front edge 13a of the front frame 13 is forced to move in a downward direction by the leg portion (the femoral region). Accordingly, the degree of tension of the cushioning member 20 is so strong that its haunch supporting portion is lifted more upward than the position at the time the standard posture is made and the haunches are lifted upward; thereby support force at the time of standing up works. Therefore, according to this embodiment, even if the seating posture is the sacrum posture, or even if the seat back is reclined backwards, easiness of standing up is improved by moving the front edge 13a of the front frame 13 in the downward direction.

Figure 6:
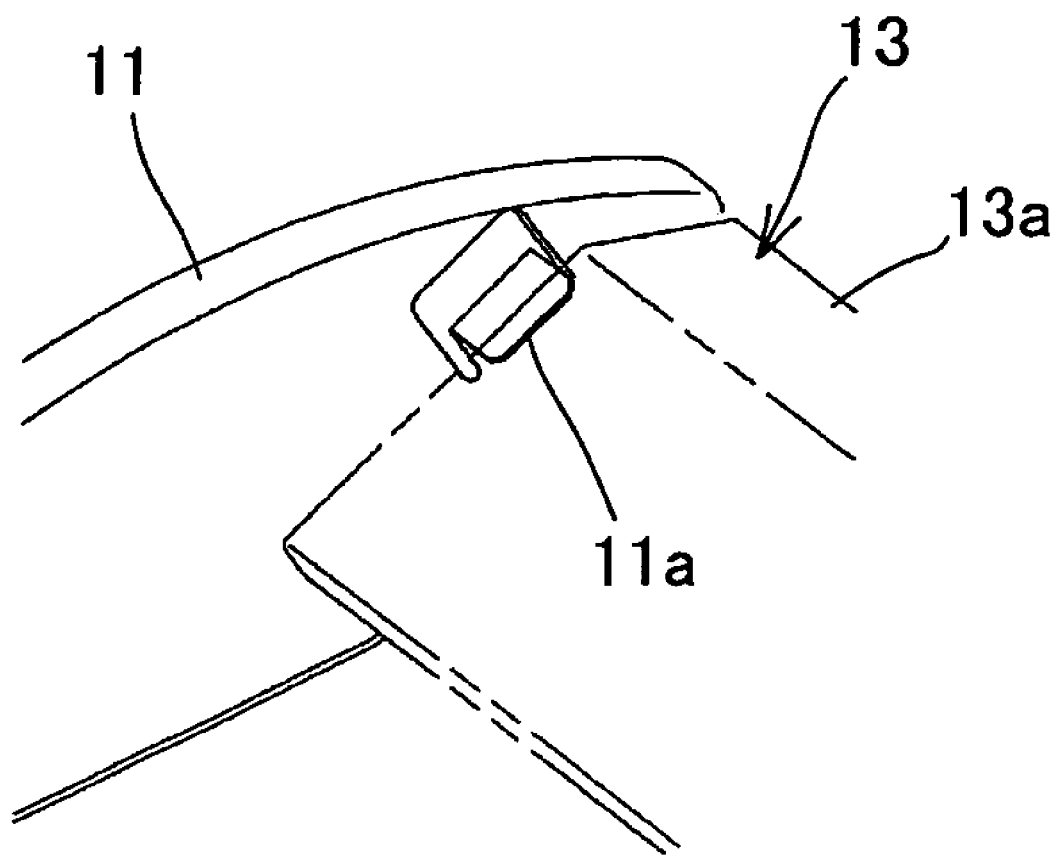
FIG. 6 is a view showing another example of an abutting piece used for the aforementioned another embodiment.

FIGS. 5A, 5B, 6 and 7 are views showing a seat structure of another embodiment of the present invention. In this embodiment, in place of the aforementioned flat-type spring member 19, an abutting piece 11a protruding inside the respective side frames 11, is used as the standard position setting member. Other structures are the same as the structures of the aforementioned embodiment. As shown in FIG. 5B, the abutting piece 11a is formed so that an L-shaped plate member is fixed inside the side frame 11 by welding or the like, and provided at a position where an upper surface of the front frame 13 can abut thereon when the person is seated in the standard posture. As shown in FIG. 6, it should be noted that, in place of the L-shaped plate member, the abutting piece 11a can be formed by cutting out a part of the side frame 11.

Figure 7:
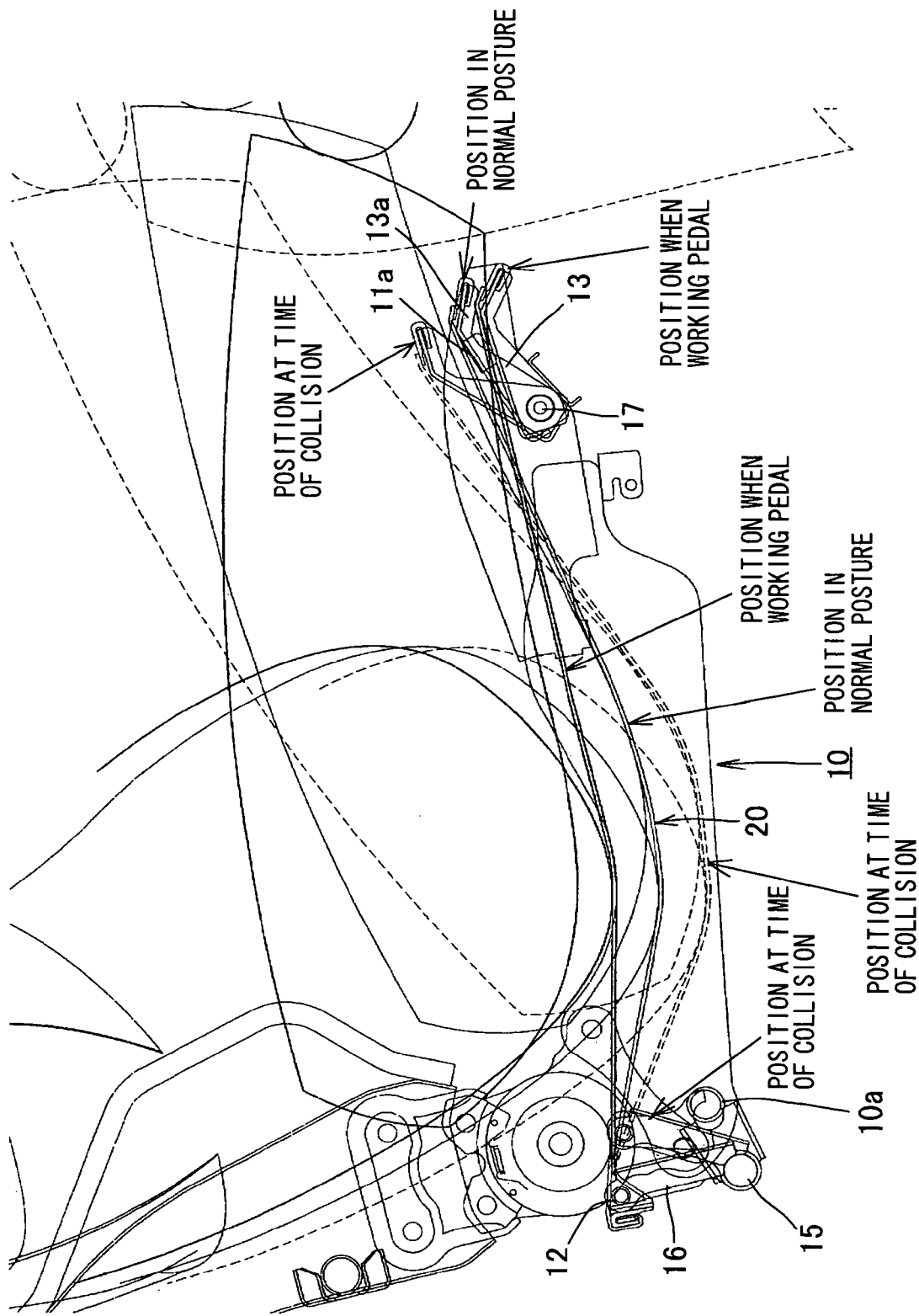
FIG. 7 is a view for explaining an operation of the seat structure relating to the aforementioned another embodiment.

According to this embodiment, as shown in FIG. 7, when the person is seated on the cushioning member 20 in the standard posture, a moving position of the front edge 13a of the front frame 13 in an upward direction is controlled because the upper surface of the front frame 13 abuts on the abutting piece 11a. The front edge 13a of the front frame 13 is forced to be moved in a downward direction by the leg portion (the femoral region) when working a pedal or standing up. As a result, the degree of tension of the cushioning member 20 is so strong that the cushioning member 20 is lifted upward, and the haunches are lifted upward, which supports working of the pedal and a movement of stand-up.

On the other hand, similarly to the aforementioned embodiment, when large impact is applied by collision and the like, the vicinity of the tuber of ischium is depressed and the leg portion is lifted upward, which results in a generation of a rotational moment around the vicinity of the tuber of ischium. In this event, the front frame 13 is so structured that its front edge 13a is moved more upward than a position controlled by the abutting piece 11a as the standard position setting member according to the depression of the cushioning member 20. In this embodiment, the abutting piece 11a protrudes inside the side frame 11; therefore, when a force is applied so that the front edge 13a of the front frame 13 is moved more upward than the standard position, the abutting piece 11a is so transformed that an amount of protruding inside the side frame is small, and the front edge 13a of the front frame 13 is moved upward beyond a position of the abutting piece 11a. Accordingly, similarly to the aforementioned embodiment, a force to alienate the human body from a seat surface is suppressed, and the back of the human body is pressed against the seat back of the seat, so that impact applied on the human body is effectively reduced.

A seat structure of the present invention includes a torsion bar arranged along a width direction, and an arm connected to the torsion bar and enforced in a direction of falling backwards in a normal state by the torsion bar in the rear of a seat cushion; furthermore, the seat structure is so structured that a cushioning member is strained between a supporting frame supported by the arm and a front frame provided at the front of the seat cushion, whose front edge is vertically movable rotationally. Therefore, a spring characteristic to give an influence on comfortability or riding comfort at the time of being seated can be given by the torsion bar, so that the number of coil springs which have been conventionally necessary in the vicinity of a body side can be reduced or the use of the coil spring can be stopped. Accordingly, the cushioning member to be used can be made thinner than the conventional ones, or the number of stacked layers can be reduced so that the seat structure can be reduced in weight. Moreover, the use of the torsion bar improves vibration absorbency; and simultaneously, when a large load is inputted, impact at the time of inputting a large load can be reduced due to a rotational moment around the vicinity of the tuber of ischium of a human body, resulting in further improvement of impact absorbency.

Furthermore, since the torsion bar is structured to change its pivoting angle in response to a difference in physique and a difference in posture, it does not damage a fittability of the cushioning member to the human body regardless of the difference in physique and the difference in posture, and is excellent in physique difference absorbency, posture difference absorbency, and body movability. Therefore, even to a transformed posture such as a so-called sacrum posture and the like, a comfortable feeling of seating can be given by transformation of the cushioning member in response thereto, which contributes to improvement of sitting comfort for a user of a wheel chair or the like.

Furthermore, since the front edge of the front frame provided at the front of the seat cushion is vertically movable, not only an impact alleviation function derived from a rotational moment around the vicinity of the tuber of ischium of the human body at the time of the aforementioned input of the large load is more remarkably exhibited but also the fittability of the cushioning member when the sacrum posture is made can be further improved. Furthermore, when working a pedal or standing up, since the front edge of the front frame is forced to move in a downward direction by a leg portion (a femoral region), a haunch supporting portion of the cushioning member is relatively lifted upward and support force to lift up the haunches works; therefore, operationality of the pedal can be improved and a movement of standing up can be easily made.

While preferred embodiments of the invention have been described with a certain degree of particularity with reference to the drawings, obvious modifications and variations are possible in light of the above teachings. The scope of the invention is to be determined from the claims appended thereto.

We claim:

1. A seat structure, comprising:
   an arm arranged in the rear of a seat cushion and held in a torsionally flexible position by a torsion bar having a torque toward the rear of said seat structure;
   a supporting frame supported by said arm and arranged along the rear of the seat cushion;
   a pair of parallel side frames extending along the sides of said seat cushion;
   a front frame arranged in the front of the seat cushion, having a predetermined width in a longitudinal direction of the seat cushion, and movably coupled to said side frames such that the front edge of said front frame is angled in a vertical direction;

a first cushioning member spread over said supporting frame and said front frame, and held taut by the torque of the torsion bar; and a standard position setting member coupled to either or both of said side frames, structured and arranged to set a standard position by limiting the upward movement of the front edge of said front frame when a person is seated on said first cushioning member in a standard posture, and wherein the standard position setting member is structured and arranged not to limit the upward movement of the front edge of said front frame when any portion of said first cushioning member is depressed with a force that is substantially greater than the force applied to the first cushioning member when a person is seated on said first cushioning member in a standard posture, and a haunch supporting portion of said first cushioning member is lifted upward by forcing the front edge of said front frame downward below the standard position.

2. The seat structure according to claim 1, wherein said front frame is made of a plate-shaped member having a predetermined width in the longitudinal direction of the seat cushion, and its rear edge is supported pivotably between said side frames of the seat cushion.

3. The seat structure according to claim 1, wherein said standard position setting member is an elastic member that maintains the front edge of said front frame in the standard position by applying a downward force to the front edge of the front frame thereby counteracting an upward force that is applied to the front edge of the front frame caused by the tension of said first cushioning member generated when a person is seated on said first cushioning member in a standard posture.

4. The seat structure according to claim 3, wherein the elastic member comprises a flat-type spring member coupled to the front edge of said front frame and a fixed frame arranged below said front frame.

5. The seat structure according to claim 1, wherein said standard position setting member is an abutting piece for abutting an upper surface of said front frame when a person is seated on said seat structure in a standard posture and for setting the front edge of said front frame at the standard position.

6. The seat structure according to claim 1, wherein said first cushioning member comprises any one kind selected from a flat-type spring member, a three-dimensional net member, and a urethane member or a combination of two kinds or more of these members.

7. The seat structure according to claim 1, wherein a second cushioning member is arranged above said cushioning member.

8. The seat structure according to claim 7, wherein said second cushioning member is coextensive with said first cushioning member spread over said supporting frame and said front frame, and is held taut by the torque of the torsion bar.

9. The seat structure according to claim 7, wherein said second cushioning member comprises any one kind selected from a flat-type spring member, a three-dimensional net member, and a urethane member or a combination of two kinds or more of these members.

* * * * *